(12) United States Patent
Scarpino

(10) Patent No.: US 6,748,496 B1
(45) Date of Patent: Jun. 8, 2004

(54) METHOD AND APPARATUS FOR PROVIDING CACHEABLE DATA TO A PERIPHERAL DEVICE

(75) Inventor: Anthony Scarpino, Scarborough (CA)

(73) Assignee: ATI International Srl, Christchurch (BB)

( * ) Notice: Subject to any disclaimer, the term of this patent is extended or adjusted under 35 U.S.C. 154(b) by 0 days.

(21) Appl. No.: 09/551,107

(22) Filed: Apr. 18, 2000

(51) Int. Cl.[7] .............................................. G06F 12/08
(52) U.S. Cl. ........................ 711/137; 711/204; 711/145; 710/56
(58) Field of Search ................................. 711/137, 135, 711/156, 204, 145; 710/56, 52, 39

(56) References Cited

U.S. PATENT DOCUMENTS

| | | | | |
|---|---|---|---|---|
| 5,381,539 A | * | 1/1995 | Yanai et al. ................. 711/133 |
| 5,701,435 A | * | 12/1997 | Chi ............................. 711/125 |
| 5,734,881 A | * | 3/1998 | White et al. ................. 712/238 |
| 5,933,835 A | * | 8/1999 | Adams et al. ............ 707/104.1 |
| 5,958,040 A | * | 9/1999 | Jouppi ........................ 711/122 |
| 6,141,728 A | * | 10/2000 | Simionescu et al. ........ 711/113 |
| 6,393,527 B1 | * | 5/2002 | Rao et al. ................... 711/137 |
| 2002/0138700 A1 | * | 9/2002 | Holmberg ................... 711/137 |

* cited by examiner

Primary Examiner—Pierre-Michel Bataille
(74) Attorney, Agent, or Firm—Vedder, Price, Kaufman & Kammholz, P.C.

(57) ABSTRACT

A cache controller (210) includes a streaming memory attribute. The cache controller (210) is coupled to provide data from a cache line within a cache (228) to a memory (124) when both (a) the cache line is full and (b) the streaming memory attribute is set.

17 Claims, 5 Drawing Sheets

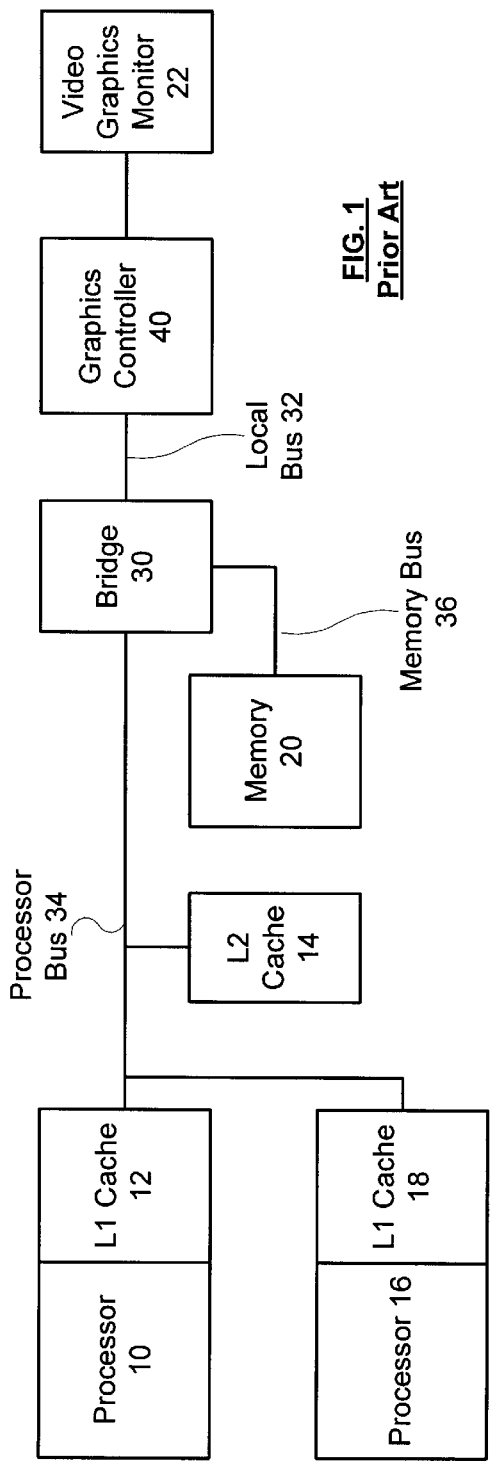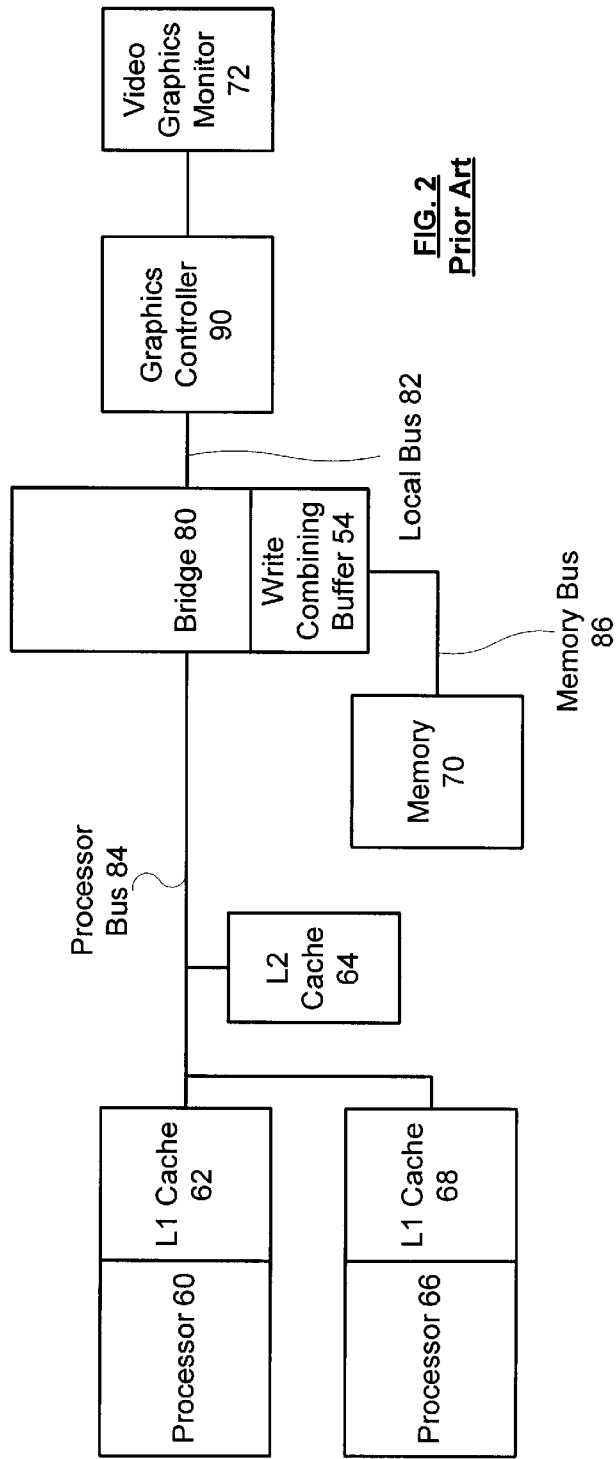

METHOD AND APPARATUS FOR PROVIDING CACHEABLE DATA TO A PERIPHERAL DEVICE

FIELD OF THE INVENTION

The invention relates generally to cacheable memory within computer systems and more particularly to providing cacheable data to a peripheral device.

BACKGROUND OF THE INVENTION

Many computer systems include a processor, memory unit, and a graphics controller. The processor performs computations on data that the processor accesses in the memory unit. The graphics controller obtains data from the memory unit and displays the data on, for example, a computer monitor. Many computer systems increase processor computation speed by providing a cache between the processor and the memory unit. The cache is a high-speed random access memory (RAM) that the processor accesses more quickly than the processor can access the memory unit.

A computer system implementing a write-through cache scheme provides data from the processor directly to the memory unit, and then fills caches with data from the memory unit. The memory unit therefore always contains a recent version of the data. Such systems are generally slower than computer systems implementing a write-back or copy-back cache scheme. Computer systems implementing a write-back or copy-back cache scheme provide data from the processor directly to the cache or caches, and then write data from the caches to the memory unit only when it is necessary. Although the memory unit does not always contain a recent version of the data, the computer system can generally operate more quickly in a write-back cache scheme, since the processor can access data almost immediately after writing the data.

The cache typically includes data that the processor has written recently, organized into cache lines, limited by the capacity of the cache. A cache typically includes several cache lines, each cache line holding 32 bytes of data. Each cache line corresponds to a small contiguous range of addresses within the memory unit. A cache controller, typically found within the processor, manages cache lines within the cache.

In some computer systems, caches and even cache lines have attributes. Some attributes indicate whether a particular cache, or a particular cache line, is to be considered write-back or write-through. For example, in some computer systems, some caches (or some cache lines within a cache) within a computer system may be write back, while other caches or cache lines are write through caches. Other attributes indicate a cache state of a cache or cache line. Cache states include, for example, the MESI ("Modified/Exclusive/Shared/Invalid") state or "dirty" state of a cache line in snoopable multi-cache computer systems. Attributes are typically stored either in a portion of the cache itself or in a portion of the memory that is reserved for the cache.

Attributes are typically set upon configuration. When power is initially applied to the computer system, the computer system initiates configuration and executes a basic input/output system (BIOS) including a power-on self-test (POST), and then launches an operating system. The BIOS and operating system include routines that determine what resources are available within the computer system, and create files in the memory that allow the computer system to identify and use the resources. Conventionally, the BIOS or operating system sets cache attributes and memory attributes during this configuration execution.

"Prefetching" is a mechanism for making data available to a processor before the processor requests the data. The cache controller prefetches data by copying the data from the memory unit into the cache line. Whenever the processor accesses data in a cache, prefetching fills the remaining locations within the cache line with data from nearby locations. According to the well-known principles of temporal and spacial locality, a processor that accesses data in one location is soon going access other data stored in a nearby location. Prefetching reads data from memory unit into a cache line whenever the processor accesses the cache line. Prefetched data is immediately available to the processor without additional memory unit access delays.

When the processor writes to the cache, the cache controller determines whether the address of the data falls within any of the ranges of data addresses corresponding to any of the cache lines already residing within the cache. If the data falls within such a range of addresses, the data to be written immediately replaces the data within the appropriate cache line: located within the cache. If the address does not fall within such a range of addresses, then the cache controller will firstly, fetch the appropriate portion from the memory unit to create the cache line within the cache. Secondly, the new data to be stored then replaces the data within the new cache line (that has been prefetched).

If the cache is already saturated with data and has no available cache locations, then the cache controller pushes a data line out of the cache and reallocates the cache line for the processor data and the prefetched data. Different computer systems use different algorithms for selecting the cache line. The pushed cache line is copied into either another cache or to the memory unit.

Processors can read data from their caches much more quickly than they can access the memory unit. In systems with multiple caches, cache controllers can snoop the memory unit bus for transactions that affect data contained within the cache and update their local copies of data accordingly. Cache incoherency can arise when a processor has a more current value in a local cache and some other peripheral or processor sees a different or "stale" value. Cache incoherency is not a problem unless a processor needs data that is only stored in caches with which the processor does not share a bus. When a processor does not share a bus with a cache containing data that the processor needs, the cache controller generally must flush the data to the memory unit.

In high performance computer systems that employ a write-back or copy-back caching algorithm, the computer system only writes data to the memory unit when the caches are all full or when a processor needing data in the cache does not share a bus with the cache containing the data. Otherwise, cache incoherency can develop. A cache line may become incoherent if its data has not been copied into the memory unit and some other unit within the computer system is requesting the same data. Cache flushing forces the cache controller to copy data from the cache into the memory unit, but it is used sparingly because writing to the memory unit is a time-consuming operation.

A graphics controller generally contains a processor or other bus master that requires data from the processor. The graphics controller is often implemented on a separate card, such as an expansion card, and frequently operates in parallel with the processor but at a different speed or synchronization. Accordingly, the graphics controller generally cannot share a common bus with the processor, due the complexity of interconnections that would be necessary. The complexity of providing interconnections to allow the graphics controller to snoop the processor bus is prohibitive. To provide data to the graphics controller, the processor generally stores the data in the memory unit. The graphics controller obtains graphics or drawing command data directly from the memory unit, or across a bridge. Bridges such as the Intel Northbridge couple the processor (or caches) on a processor bus, the memory unit on a memory bus, and a graphics controller on a graphics bus or peripheral components interconnect (PCI) bus.

Many computer systems use memory mapping to address peripheral devices such as a graphics controller. In such computer systems, the processor may attempt to write to addresses that do not exist in memory. The computer system has a hardware implementation that routes such write commands to the appropriate peripheral devices. When the peripheral device is busy or operates asynchronously with the processor, the processor may store the data in a reserved portion of the memory unit. The memory unit of such computer systems is divided into portions, each portion of the memory unit being reserved for a distinct one of the peripheral devices.

Thus, consider an example of a computer system where the processor will need to supply graphics data and drawing commands to a graphics controller via the memory unit, and subsequently, the graphics controller will asynchronously request data from the same memory unit. The processor is burdened with making sure graphics data and drawing commands are kept coherent with data that is potentially located within a cache. Some computer systems solve this problem by forcing the portion of memory that is accessed by a peripheral device (in this example, a graphics controller) to be un-cacheable. This results in poor processor bus utilization and lower efficiency since there are numerous small transactions that occur. Other computer systems solve this problem by forcing the software (associated with the peripheral device, often called a driver) to issue a cache flushing instruction upon completing a cache line. This results in additional overhead during memory write transactions and can temporarily stall the processor during time critical operations. Another problem with this scheme is that the cache will eventually become saturated with graphics data and drawing commands that will not be referenced by the processor again.

Consequently, there is a need for a computer system that:
 (a) promptly makes the most recent version of the graphics data or drawing commands available to the graphics controller
 (b) achieves a high rate of data transfer,
 (c) does not unnecessarily impose on the processor

BRIEF DESCRIPTION OF THE DRAWINGS

FIG. 1 shows a computer system according to a well-known configuration.

FIG. 2 shows a computer system that is similar to the computer system of FIG. 1, but which has been modified according to a known configuration.

DETAILED DESCRIPTION OF A PREFERRED EMBODIMENT OF THE INVENTION

Figure 3:
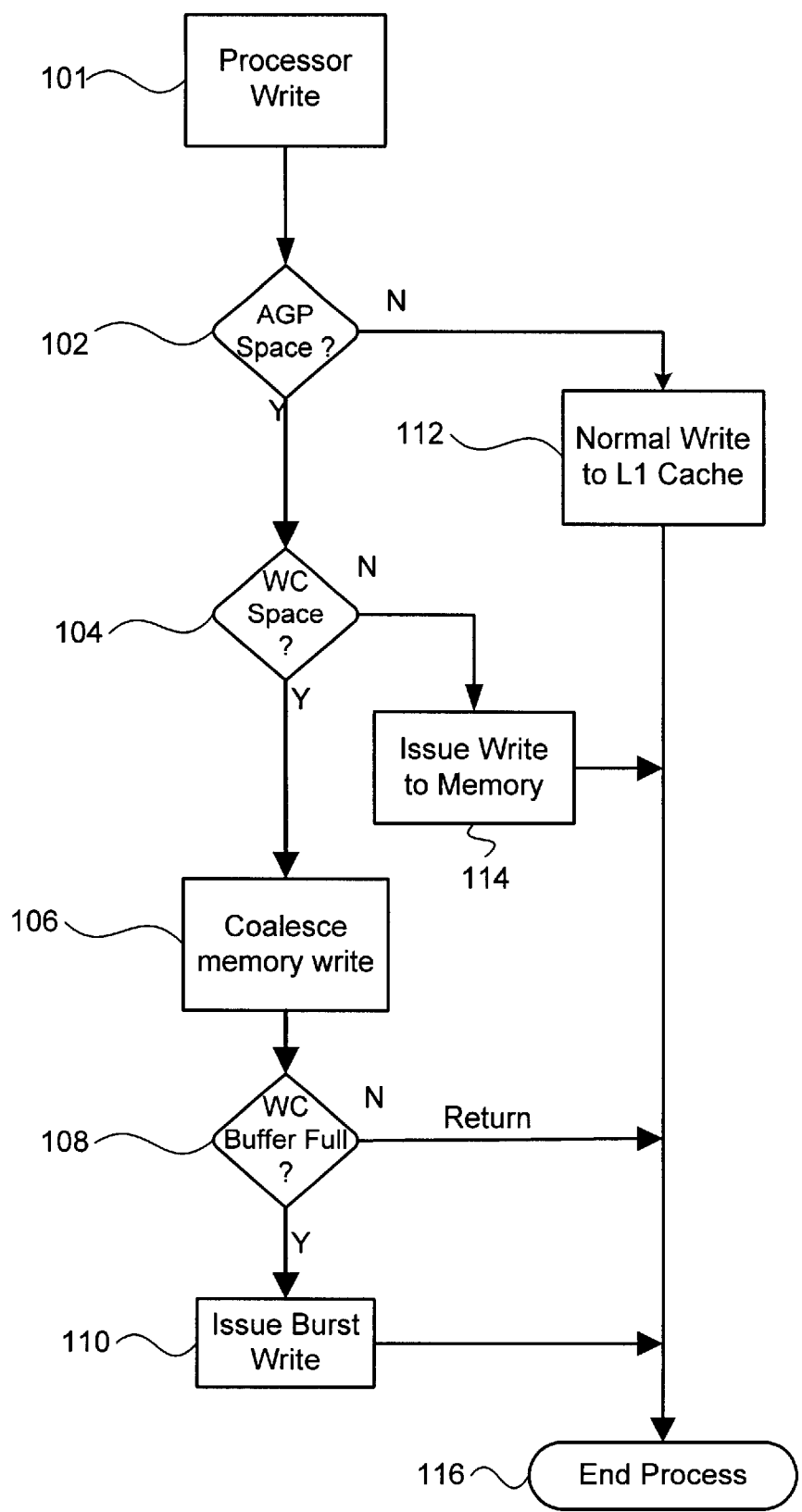
FIG. 3 shows an algorithm according to the known structure illustrated in FIG. 2.

A computer system allows a graphics controller to access the most recent version of data by determining which data in a cache or caches is destined for the graphics controller, and flushing such data to memory as soon as it is written by the processor. Other data written by the processor is not affected. Eliminating the prefetching, and prohibiting the processor from reading data marked for the graphics controller, further increases the data transfer speed from the processor to the graphics controller via the memory unit.

FIG. 1 shows a computer system according to a well-known configuration. A processor 10 processes data and stores the data in an on-chip L1 cache 12. A processor 16 processes data and stores the data in an on-chip L1 cache 18. A processor bus 34 couples both processor 10 and processor 16 to a bus bridge 30 and to an L2 cache 14. A memory bus 36 couples the bus bridge 30 to a memory 20. The L2 cache 14 is off chip and stores data pushed out of the L1 cache 12 and the L1 cache 18.

Memory 20 is a large dynamic RAM having, for example, 256 Megabytes of storage capacity. Memory 20 is coupled to the processor bus 34 via a bridge 30 that also couples the memory 20 to a graphics controller 40. As the processor 10 and processor 16 store data in the memory 20 via the bridge 30, the graphics controller 40 accesses some of the data in the memory 20 and presents such data on a video graphics monitor 22.

To perform high speed processing, the processor 10 and processor 16 store data in the L1 cache 12 and L1 cache 18, respectively. Data stored in the L1 cache 12 and L1 cache 18 may, however, be incoherent with the memory 20. When a cache is incoherent, the cache contains data that is not necessarily stored in the memory. For example, when a processor such as processor 10 writes data to a cache line within the L1 cache 12, such data is not necessarily stored in a most recent version within the memory 20. Storing the data within memory 20 is generally unnecessary with respect to processor performance, since the data within the L1 cache 12 is always available to the processor 10 and can be snooped by the processor 16.

FIG. 2 shows a computer system that is similar to the computer system of FIG. 1, but which has been modified according to a known configuration. The modification to FIG. 1 illustrated in FIG. 2 includes a write combining buffer 54 coupled to a bus bridge 80. The write combining buffer 54 operates similarly to the L1 cache 62, but has longer cache lines capable of storing more data than a cache line of the L1 cache 62.

A processor 60 processes data and stores the data in the L1 cache. A processor 66 processes data and stores the data in an on-chip L1 cache 68. A processor bus 84 couples both processor 60 and processor 66 to a bus bridge 80 and to an L2 cache 64. A memory bus 86 couples the bus bridge 80 to a memory 70. The L2 cache 64 is off chip and stores data pushed out of the L1 cache 62 and the L1 cache 68.

The bridge controller associated with the bridge 80 is configured to provide burst writes to a memory 70. A burst write consists of a write that provides many bytes of data to the memory 70. When the bridge 80 see data that belongs to a data burst, the bridge will collect the write transactions from either processor 60 or processor 66 into a write combining buffer 52. When the write combining buffer 52 fills with a predetermined number of bytes of data, the bridge writes all of the data in the write combining buffer to the memory 70.

The bridge 80 will collect write transactions from the processor into the write combining buffer 52 only under specific conditions. The conditions are that the address of the write falls within a pre-configured range of addresses and the range of addresses is not cached by either L1 cache 62, L1 cache 68 and L2 cache 64. In this system, the L1 cache 62, L1 cache 68 and L2 cache 64 cannot trap or hold data in this address range.

The data from the write combining buffer 52 proceeds from a bridge 80 to the memory 70. Once the data is stored within the memory 70, the data is available to the graphics controller 90. When the graphics controller 90 determines to update video data provided to a video graphics monitor 72, the graphics controller 90 obtains the graphics data from the memory 70 via the bridge 80.

A processor 66 behaves similarly to the processor 60. The processor 66 provides normal data to an L1 cache 68, and graphics data and or video data will also go to write combining buffer 52. When the processor 66 provides such data, each processor write will go directly into a write combining buffer 52 and eventually is burst onto the memory bus 86 into memory 70. When the write combining buffer 52 sees that the writes to consecutive addresses has ceased, the current data in the write combining buffer is sent to memory 70.

FIG. 3 shows an algorithm according to the known structure illustrated in FIG. 2. This algorithm describes the control logic in bridge 80 that is used for write combining operations. Initially, at step 102, the processor 60 determines whether the data that the processor 60 writes is graphics data. If the data is graphics data, then the processor 60 passes an address that is within a graphics portion of the memory 70. If, however, the processor 60 determines that the data is for the graphics controller 90, then the processor proceeds to step 104.

At step 104, the bridge 80 determines whether the data belongs to a burst write by monitoring the addresses of the write transactions. Only write transactions to consecutive addresses can be handled by the write combining buffer 52. Thus, if the data from processor 60 occurs in an address range marked as write-combining, then the bridge 80 temporarily stores the data in the write collecting buffer 52. At step 106, the bridge 80 coalesces memory writes by storing data within buffer(s) of the write collecting buffer 52. At step 108, if a write combining buffer is filled, then the bridge 80 pushes a burst of data from the write collecting buffer 52 to memory 70.

Figure 4:
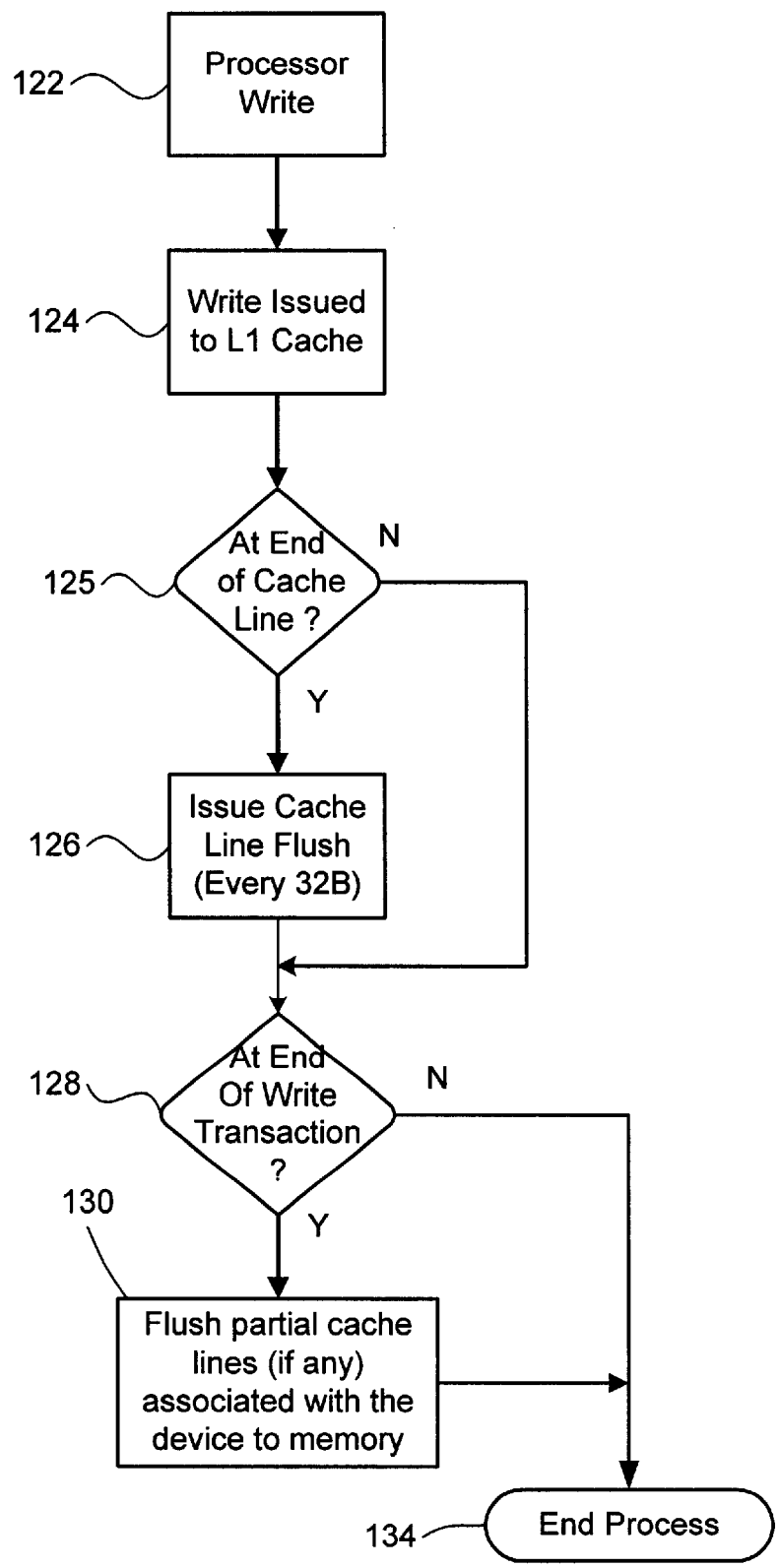
FIG. 4 shows an algorithm according to an alternate well-known structure.

FIG. 4 shows an algorithm according to an alternate well-known structure. This algorithm describes the control flow of a software program that is attempting to write data that is marked as cache-able in L1 or L2 and this data must ultimately show up in memory 70. As shown in FIG. 4 at step 122, the processor commences a write transaction to the L1 cache 62 or the L2 cache 64. At step 125, the software program must determine when a cache line has been filled by inspecting whether an address associated with the data is the last address of a cache line. If the address is not the last address within a cache line, then the processor 60 has completed the cached storage of the data and proceeds to step 128. Of course, if there is a cache miss associated with step 122, a selected line of the selected cache is pushed out to memory and control proceeds to step 125.

At step 126, when the address is at the end of a cache line, the processor 60 issues a cache line flush instruction, as requested by the software program. The processor issues the cache line flush instruction to push the cache line data to the memory 70, freeing up a cache line within the selected cache. At step 128, the software program determines whether the all of the required data has been written out to memory, and if so, terminates the algorithm and flushes any cache lines, including those that were not filled.

FIG. 3 and FIG. 4 also show limitations associated with some of the well-known computer systems and algorithms. For example, in FIG. 3, this algorithm relies on the existence of a write combining buffer 52 within the bridge 80. The bridge 80 inspects all write transactions from the processor (s) to see if they fall within a pre-specified range so that they may be combined. However, this address range must be marked as un-cache-able for the algorithm to work properly. Therefore, any read transactions the processor(s) may issue on this address range will be relatively slow, since the data cannot be cached and must be fetched from memory 70.

The algorithm of FIG. 3 implements an inefficient use of processor bus 84. Every write transaction issued by processor 60 or processor 66 will travel on processor bus 84 to be combined at the bridge 80. Efficient use of processor bus 84 is important to multi-processing systems, thus, it is important to use this bus in an optimal fashion.

The algorithm of FIG. 4, on the other hand, has other drawbacks. Firstly, it is implemented in software and therefore lowers the overall instruction execution efficiency of the processor(s). After every 32 bytes of data written by a given processor, a cache line flush instruction needs to be executed by the processor (under control of the software program). This algorithm can be modified so that the flushing of each cache line is left to be done automatically by the cache controller, however, this results in the filling of L1, L2 or any other caches with the data being written. Normally, this is a good scenario. However, considering we are writing data that ultimately needs to arrive at an external peripheral and will not be referenced again (such as graphic command data or video data), the net result is the pollution of data caches L1, L2 etc. FIG. 4 shows a known algorithm in accordance with the known computer system of FIG. 1. Because the algorithm of FIG. 4 issues a cache line flush instruction every time the processor writes an additional 32 bytes of data to the L1 cache 12, the algorithm of FIG. 4 requires heavy use of the processor. Such heavy use of the processor can detract from the overall performance of the computer system.

Figure 5:
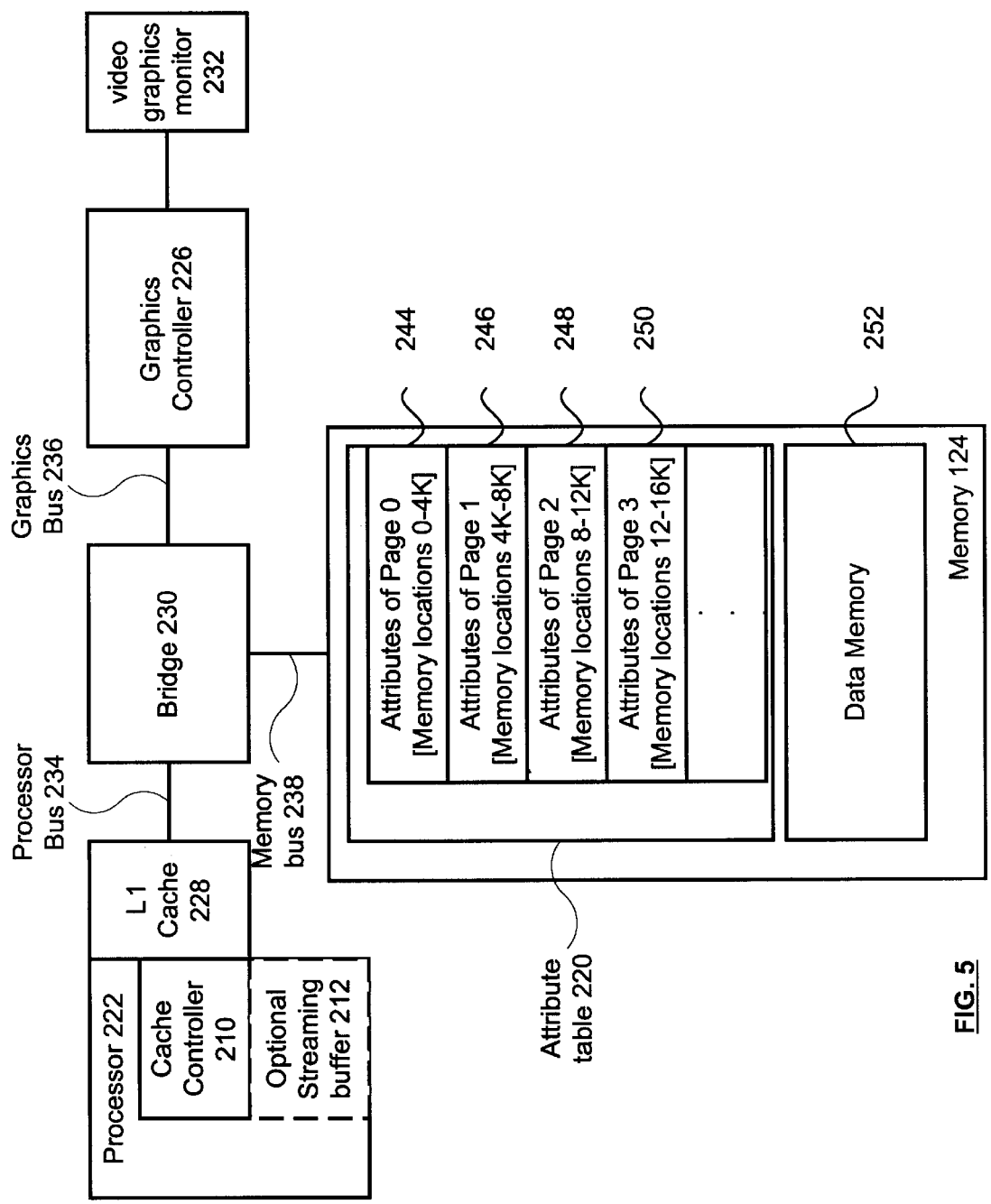
FIG. 5 shows a computer system in accordance with an embodiment of the present invention.

FIG. 5 shows a computer system in accordance with an embodiment of the present invention. The computer system of FIG. 5 includes a processor 222 and an L1 cache 228 coupled via a processor bus 234 to a bridge 230. A graphics bus 236 couples the bridge 230 to a graphics controller 226 and a video graphics monitor 232. A memory bus 238 couples the bridge 230 to a memory 124. The processor 222 also embodies a streaming buffer 212.

The processor 222 is an exemplary device that generates cacheable data for the graphics controller 226. The processor 222 may be replaced in other embodiments with another device having caches that also generates cacheable data for the graphics controller 226, such as an embedded controller. In still other computer systems, the memory 124 is coupled directly to the graphics controller 236 via a PCI bus without an intervening bridge.

The processor 222 includes a cache controller 210 that manages the L1 cache 228. In other embodiments, the cache controller 210 may be located in another device on the processor bus 234. In some embodiments, additional caches are included, or the L1 cache 228 may be replaced with one or more off-chip caches, cluster caches, or multilevel caches. The L1 cache 228 or the cache controller 210 may also be replaced within a snoopable cache controller that is configured to snoop caches belonging to other processors.

In some embodiments, the computer system includes a cache controller residing within the bridge 230, instead of a cache controller 210 residing within the processor 222.

The processor 222 includes a streaming buffer 212 that will be used by the processor to coalesce write transactions (within an appropriate range of memory) into storage within the streaming buffer 212.

In one exemplary embodiment, the memory 124 contains a data memory 252 organized into pages. Each page of the memory 124, in this example, has 4 kilobytes of memory. The memory 124 also contains an attribute table having several page attribute records. Each of the page attribute records uniquely corresponds to a predetermined page of the data memory 252. For example, page zero of memory 252 (i.e., memory locations 0–4$k$) has attributes that are stored in an attribute record 244. Page 2 of data memory 252 (i.e., memory locations 4$k$ to 8$k$–2) has attributes stored in an attribute record 246. Page 2 of data memory 252 (i.e., memory locations 8$k$ to 22 $k$–2) has attributes stored in an attribute record 248. Page 3 of data memory 252 has attributes stored in an attribute record 250.

Each attribute record stores several attributes of the corresponding page of data memory 252. This memory paging scheme is common in current computer systems. However, according to the described embodiments of the present invention, the attributes include an additional indicator of whether the corresponding page of data memory 252 is dedicated to streaming memory. This indicator also indicates whether the corresponding page of data memory 252 is accessible to the graphics controller 226.

In another exemplary embodiment, the memory 124 contains a data memory 252 organized into lines. The memory 124 also contains an attribute table having several line attribute records. Each of the line attribute records uniquely corresponds to a predetermined line of the data memory 252.

The processor 222 of FIG. 5 issues write instructions to the memory 124. Some of the write instructions have associated addresses that fall within a range of addresses memory mapped to a graphics controller 226. The processor 222 typically stores data within the L1 cache 228 according to efficient, well-known caching strategies. However, the processor 222 can recognize whether the data is graphics data intended for the graphics controller 226. If the data is intended for the graphics controller 226, the processor 222 stores data within the streaming buffer 212, according to efficient, well-known caching strategies, just as L1 cache 228.

In some embodiments of the present invention, whenever the processor 222 issues a write instruction to the L1 cache 228, the cache controller 210 attempts to prefetch additional data from the memory 124. However, the processor will examine a streaming memory attribute stored within the attribute table containing the address of the write instruction. If the streaming memory attribute is marked, then processor 222 will not permit the cache controller 210 to prefetch additional data. If the streaming memory attribute is not marked, then the processor 222 permits prefetching as normal L1 cache 228 behavior Disabling prefetching suppresses a flow of data from the memory 124 to the L1 cache 228. The memory 124 receives the streaming memory attribute upon system configuration, when the processor 222 determines the memory requirements of the graphics controller 236.

In other embodiments, the streaming buffer can exist within the L1 cache 228 itself since it's behavior is so similar to that of an L1 cache. The cache controller 210 copies the streaming memory attribute from the memory 124 to a cache line attribute table residing within the L1 cache 228 itself The cache line attribute table within the L1 cache 228 contains a streaming memory attribute for each cache line in the L1 cache 228. When the processor 222 writes to a cache line of the L1 cache 228, the cache controller 210 examines the streaming memory attribute for the cache line. If the streaming memory attribute for the cache line is marked for graphics data, then the cache controller 210 does not attempt to prefetch any additional data from the memory 124 into the cache line. If the streaming memory attribute for the cache line is not marked for graphics data, then the cache controller 210 attempts to prefetch any additional data from the memory 124 into the cache line according to well-known prefetching methods.

In still other embodiments, the processor 222 determines a streaming memory attribute for data on a byte-by-byte basis, and directs the write instruction to a cache line that is already marked according to an appropriate attribute. When the processor initiates a write instruction to the memory 124, the cache controller 210 either selects an available cache line or makes a cache line available according to well-known cache handling methods. However, if the data is graphics data, then the cache controller 210 marks an available cache line for streaming memory, and writes the data within the L1 cache 228 as streaming memory. If the data is non-graphics data, then the cache controller 210 writes the data to the cache line within the L1 cache 228 without marking the cache line for streaming memory.

If no cache line within the L1 cache 228 is marked appropriately, the processor 222 marks each cache line upon writing a first value into the cache line. The processor 222 can subsequently write additional graphics data into a cache line already marked as containing graphics data. The separate dedicated streaming buffer 212 within the computer system of FIG. 5 is optional, since the processor 222 can assign cache lines within the L1 cache 228 to graphics data. In one exemplary embodiment, the processor 222 marks data within the L1 cache 228 on a page-by-page basis. In other embodiments, the processor 222 marks data within the L1 cache 228 on a cache line by cache line basis. These embodiments do not mark data within the L1 cache 228 on a cache-by-cache basis.

Marking data as streaming memory disables prefetching of additional data from the memory to the cache line. Avoiding prefetching of data significantly reduces the burden on the processor bus 234, but has no affect on the availability of data to the processor 222.

The processor 222 also stores non-graphics data within the L1 cache 228. The processor 222 reads non-graphics data from the L1 cache 228, and prefetches additional data from the memory to the cache line. The cache controller 210 operates on non-graphics data according to conventional cache-handling strategies.

When a cache controller 210 of processor 222 indicates a cache miss upon attempting to write to the L1 cache 228, and allocates a cache line of the L1 cache 228 to new data, the processor 222 also engages in a process according to one embodiment to the present invention. In this process, the processor 222 determines whether the data is intended for the graphics controller 226. If the data is not intended for the graphics controller 226, then the processor 222 handles the data according to well-known efficient cache handling techniques.

If, however, the processor 222 determines that the data is intended for the graphics controller 226, the processor 222 allocates a cache line of the L1 cache 228 for the new data (possibly pushing a cache line of data out of the L1 cache 228 in the process) and bypasses any prefetching of additional data to the cache line. The processor 222 thereafter can write to that cache line.

Moreover, when a cache line marked for streaming memory is full, the processor 222 (and without instruction from a software program) immediately performs a cache line flush pushing the cache line of data to the memory 124, even if other cache lines within the L1 cache 228 remain available for the processor 222. When the processor 222 pushes the full cache line out to the memory 124, such data within the cache line is immediately available to the graphics controller 226. The graphics controller therefore does not have to wait for the L1 cache 228 to fill before acquiring data. When the address fills a cache line and the a streaming memory attribute corresponding to the address is set, the cache controller copies all of the data in the cache line into the memory and makes the cache line available for accepting new data. This strategy also prevents the pollution of L1 cache 228 with data that will not be read back at a later time.

The computer system of FIG. 5 is therefore an extremely efficient compromise between the computer system of FIG. 1 and the computer system of FIG. 2. Unlike the computer system of FIG. 2, the computer system of FIG. 5 does not wait for the L1 cache to fill before writing data to memory. Instead, in some circumstances, the computer system of FIG. 5 writes data to memory as soon as a cache line fills (even if the other cache lines of the L1 cache 228 have not filled).

Moreover, unlike the computer system of FIG. 2, the computer system of FIG. 5 does not require a cache line flush instruction every time a cache line fills. Instead, the computer system of FIG. 5 writes data to memory when a cache line fills only if the data is intended for the graphics controller 226. The usage of processor bus 234 becomes more efficient with this invention. Transactions, where possible, are coalesced into larger transactions.

The computer system of FIG. 5 is not completely devoid of prefetching. The computer system of FIG. 5 uses prefetching to recover from a system interrupt. For example, if a higher priority task capable of writing data to the L1 cache 228 interrupts the processor 222 while the processor 222 is writing data for the graphics controller 226, upon recovering from the interrupt the processor 222 may begin writing to a non-initial location within the cache line. Accordingly, the computer system of FIG. 5 does prefetch data from memory 24 when the first instruction after recovering from an interrupt is to write streaming memory data to a non-initial location of a cache line.

The high priority interrupt may occur when the processor is performing a burst write to several contiguous locations within a cache line. When an interrupt handler associated with the high priority interrupt concludes its execution and the processor returns to the writing of data, the processor may attempt to resume a burst write to the cache line. However, the interrupt handler associated with the high priority interrupt may have used the same cache line, and may have altered the data in the cache line. Accordingly, upon resuming execution following a high priority interrupt, the cache controller 210 prefetches data from the memory into the cache line.

However, the computer system of FIG. 5 only performs such prefetching when resuming from a high priority interrupt. The computer system of FIG. 5 detects the resumption from a high priority interrupt by detecting a first address of a write instruction is not a first address of a cache line. Upon detecting that the first address of a write instruction is not the first address of a cache line, the cache controller 210 prefetches data from the memory 124 regardless of whether the streaming memory attribute is marked.

In the embodiment shown in FIG. 5, the attributes are set upon configuration. When power is initially applied to the computer system, the computer system initiates configuration and executes a basic input/output system (BIOS) including a power-on self-test (POST), and then launches an operating system. The BIOS includes routines that identify and access a cache driver. The BIOS then loads the cache driver into the memory, placing a portion of the cache driver in a portion of memory known as the cache attribute table. The cache attribute table contains attributes for the caches, cache lines, and pages of cacheable memory within the computer system. The cache attribute table is accessible to the operating system, which begins execution as soon as the BIOS terminates execution.

During execution of application software on the computer system, the operating system accesses and modifies some of the attributes within the attribute table. For example, the operating system accesses a two-bit MESI field pertaining to a particular cache line. The operating system may also access the streaming memory attribute. For example, when a write instruction fills a cache line by writing data to a last cache location within the cache line, operating system accesses the "streaming memory" attribute associated within the cache line. If the streaming memory attribute is not set, the cache controller prefetches data by providing data from the cache to the memory. If the streaming memory attribute is set, the cache controller suppresses prefetching data by providing data from the cache to the memory.

The operating system can also modify the streaming memory attribute. For example, some computer systems allow a user to "hot swap" hardware devices. Hot swapping refers to the addition, removal, or reconfiguration of hardware devices while the computer system remains in a power-on state. If the computer system allows hot swapping, then a user may add an additional graphics controller, additional memory, or additional caches without removing power from the computer system. The computer system detects a change in its hardware resources and commands a full or partial hardware reconfiguration. During reconfiguration, the operating system may modify streaming memory attributes.

Figure 6:
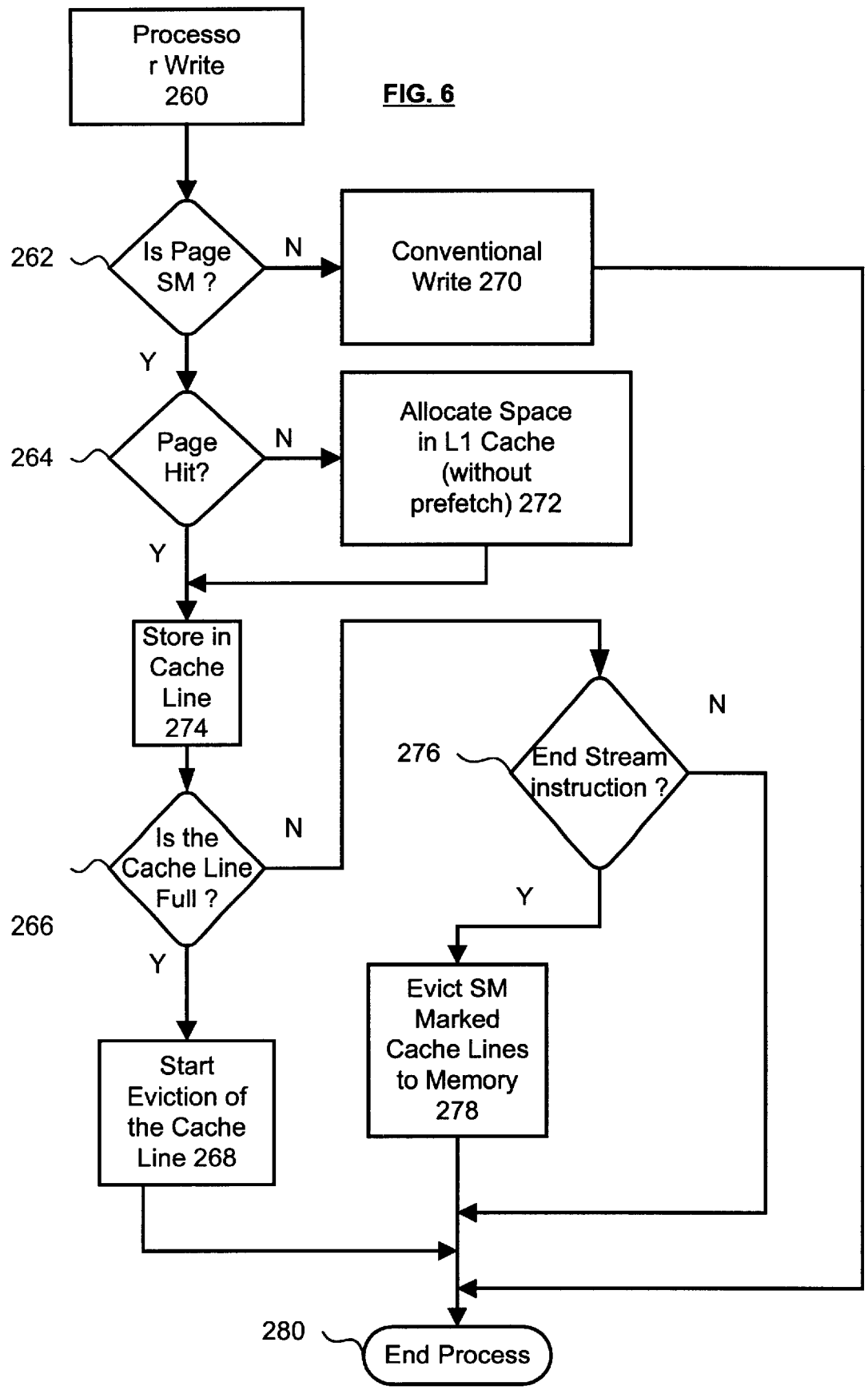
FIG. 6 shows an algorithm according to the computer system of FIG. 5, according to another embodiment of the present invention.

FIG. 6 shows an algorithm according to the computer system of FIG. 5, according to another embodiment of the present invention. At step 260, the processor 222 initiates a write instruction. At step 262, the processor 222 determines whether the page is marked for streaming memory. In other words, at step 262, the processor determines whether the data is for the graphics controller 226. If the data is not graphics data, then the cache line is not dedicated to streaming memory, and the processor 222 performs a conventional write at step 270.

If, however, the page of data memory 252 containing the address to which the processor writes data is marked for streaming memory, then at step 264 the processor 222 determines whether the address for the write instruction hits any cache line of the L1 cache 228. If the address does not hit any cache line within the L1 cache 228, then the processor 222 allocates space in the L1 cache 228, possibly pushing the cache line out onto the processor bus 234 in the process to make a cache line available. The processor then writes the data into the available cache line, but does not perform any prefetch of additional data from memory.

Regardless of whether the address hits the L1 cache 228, the processor 222 proceeds to step 266 and determines whether the cache line is full. In other words, the processor 222 determines whether the address of the write instruction is the last address of the cache line. If the cache line is not full, then at step 274 the processor 222 inserts the data into the cache line.

If the cache line is full at step 266, then the processor 222 evicts a cache line from the L1 cache 228. Eviction of the cache line at step 268 forces data from the L1 cache 228 into the memory 124 where the data is available to the graphics controller 226. Once the processor evicts the data at step 268, the processor 222 marks the cache line as available and proceeds as though a normal cache line flush has occurred.

After storing the data in the cache line at step 274, the processor 222 determines whether it has encountered an "end-of-stream" instruction. For example, if the processor 222 writes a number of bytes for graphics controller 226 that is not an integer multiple of the number of bytes within a cache line, then the graphics controller 226 must access a partial cache line of data. To get this partial cache line of data to memory for the graphics controller 226, the processor 222 evicts all stream-marked cache lines to memory at step 278 when the processor 222 detects the "end-of-stream" instruction. This instruction is only required after a complete buffer of graphics data or graphics commands has been written.

After performing steps 268, 278, or 270, the algorithm proceeds to step 280 and terminates the process. Terminating the process allows the processor 222 to proceed to other tasks.

The described computer system promptly makes the most recent version of the graphics data available to the graphics controller, without unnecessarily imposing on the processor. The described method and apparatus provide recent data to the memory at a high data rate since small write transactions are coalesced into larger transactions and burst into memory. In the first exemplary embodiment, the cache controller does not write to the memory upon completing every cache line, but rather only upon completing cache lines that contain graphics data. The cache controller does not write to the memory too infrequently, but rather writes to memory immediately whenever a cache line containing graphics data is available. Also, since a processor rarely reads graphics data once the processor writes the graphics data, the exemplary computer system suppresses prefetching when the cache controller identifies a write instruction as containing graphics data.

It should be understood that the implementation of other variations and modifications of the invention in its various aspects will be apparent to those of ordinary skill in the art, and that the invention is not limited by the specific embodiments described. For example, the cache controller may be situated within any device having a connection with a L1 cache, a L2 cache or a back-side L2 cache. It is therefore contemplated to cover by the present invention, any and all modifications, variations, or equivalents that fall within the spirit and scope of the basic underlying principles disclosed and claimed herein.

What is claimed is:

1. A cache controller couplable to a cache and to a memory, the cache comprising a cache line, the cache controller comprising:

logic to provide data from the cache to the memory when both (a) the cache line is full and (b) a streaming memory attribute of a portion of a memory subsystem is set wherein a marked streaming memory attribute represents that corresponding data is for a graphics processor, wherein:
the cache controller is operative to suppress cache prefetching when the streaming memory attribute of a portion of a memory subsystem is set.

2. The cache controller of claim 1, wherein:

the cache controller is operative to prefetch other data from the memory into the cache line when the streaming memory attribute is not marked.

3. The cache controller of claim 1, wherein:

the cache controller is operative to detect whether a first address of a write instruction is not the first address of a cache line; and the cache controller is operative to prefetch other data from the memory into the cache line when either (a) the streaming memory attribute is not marked or (b) the first address of a write instruction is not the first address of a cache line.

4. A cache controller couplable to a cache and to a memory, the cache comprising a cache line, the cache controller comprising:

logic to provide data from the cache to the memory when both (a) the cache line is full and (b) a streaming memory attribute of a portion of a memory subsystem is set wherein a marked streaming memory attribute represents that corresponding data is for a graphics processor, wherein:
the cache controller is operative to suppress cache prefetching when the streaming memory attribute of a portion of a memory subsystem is set; and
the cache controller is operative to prefetch other data from the memory into the cache line when the streaming memory attribute is not marked.

5. A memory couplable to a cache controller, the memory comprising:

a markable streaming memory attribute, the memory configured to receive a prefetch request from a cache and when the streaming memory attribute is not marked to provide prefetch data to the cache wherein a marked streaming memory attribute represents that corresponding data is for a graphics processor, wherein:
the memory is operative to suppress cache prefetching when the streaming memory attribute is set.

6. The memory of claim 5, configured to receive data from the cache when both (a) a cache line is full and (b) the markable streaming memory attribute is set.

7. The memory of claim 5, wherein:

the memory is further operative to provide prefetch data into the cache when the streaming memory attribute is not set.

8. The memory of claim 1, wherein:

the memory is operative to detect whether a first address of a write instruction is not the first address of a cache line; and to prefetch other data from the memory into the cache when either (a) the streaming memory attribute is not marked or (b) the first address of a write instruction is not the first address of the cache line.

9. A computer system comprising:

a memory;

a cache including a cache line and a streaming memory attribute; and a cache controller coupled to provide data from the cache to the memory when both (a) the cache line is full and (b) the streaming memory attribute is set, wherein:
the cache controller is operative to suppress cache prefetching when the streaming memory attribute of a portion of a memory subsystem is set.

10. The computer system of claim 9, wherein:

the cache controller is operative to prefetch other data from the memory into the cache line when the streaming memory attribute is not marked.

11. The computer system of claim 9, wherein:

the cache controller is operative to detect whether a first address of a write instruction is not the first address of a cache line; and the cache controller is operative to prefetch other data from the memory into the cache line when either (a) the streaming memory attribute is not marked or (b) the first address of a write instruction is not the first address of a cache line.

12. A computer system comprising:

a cache;

a memory;

a circuit operable to load a streaming memory attribute from a cache driver into a cache attribute table upon detecting a configuration of the computer system wherein a marked streaming memory attribute represents that corresponding data is for a graphics processor; and a cache controller operable to access the cache attribute table upon detecting an access to the cache and to selectively suppress prefetching according to the streaming memory attribute, wherein:
the cache controller is operable to
access the cache attribute table upon detecting that a write instruction fills a cache line by writing data to a last cache location within the cache line;
to suppress prefetching when the streaming memory attribute is set; and
to permit prefetching when the streaming memory attribute is not set.

13. The computer system of claim 12, wherein:

the circuit operable to load a streaming memory attribute is also operable to modify the streaming memory attribute upon detecting a reconfiguration of the computer system.

14. The computer system of claim 13, wherein:

the circuit operable to load a streaming memory attribute is also operable to modify the streaming memory attribute upon detecting an addition, removal, or reconfiguration of a hardware device while the computer system remains in a power-on state.

15. A method of accessing a memory, the method comprising:

determining whether an address fills a cache line;

determining whether a streaming memory attribute corresponding to the address is set, wherein a marked streaming memory attribute represents that corresponding data is for a graphics processor, and when the address fills a cache line and the streaming memory attribute memory attribute corresponding to the address is set, copying data corresponding to the address and residing in the cache line into the memory; and making the cache line available for accepting new data.

16. The method of claim 15, further comprising;

receiving a prefetch request including an address;

when the streaming memory attribute is not set, determining a range of addresses corresponding to the address; and providing data corresponding to the a range of addresses, from the memory to a cache;

when the streaming memory attribute is set, suppressing cache prefetching.

17. The method of claim 15, wherein:

receiving a prefetch request including an address;

when (a) the streaming memory attribute is not set, or (b) the first address of a write instruction is not the first address of a cache line:
determining a range of addresses corresponding to the address; and
providing data corresponding to the a range of addresses, from the memory to a cache;
when (a) the streaming memory attribute is set and (b) the first address of a write instruction is not the first address of a cache line:
suppressing cache prefetching.

* * * * *